United States Patent
Veltrop et al.

(10) Patent No.: US 8,376,310 B2
(45) Date of Patent: Feb. 19, 2013

(54) PINCH VALVE

(75) Inventors: Loren Veltrop, Chicago, IL (US);
Christopher Lyons, LaGrange Park, IL (US); Mark Kurth, Beverly Shores, IN (US); Tim Payne, Chicago, IL (US); Kyle Koning, Chicago, IL (US); Jim Stango, Chicago, IL (US)

(73) Assignee: Prince Castle, LLC, Carol Stream, IL (US)

( * ) Notice: Subject to any disclaimer, the term of this patent is extended or adjusted under 35 U.S.C. 154(b) by 285 days.

(21) Appl. No.: 12/885,641

(22) Filed: Sep. 20, 2010

(65) Prior Publication Data
US 2012/0068093 A1    Mar. 22, 2012

(51) Int. Cl.
*F16K 7/04* (2006.01)
(52) U.S. Cl. .................. 251/7; 251/10; 251/129.031
(58) Field of Classification Search .............. 251/9, 10, 251/7, 129.03; 222/504
See application file for complete search history.

(56) References Cited

U.S. PATENT DOCUMENTS

| | | | | |
|---|---|---|---|---|
| 4,436,277 A | * | 3/1984 | Robak et al. | 251/6 |
| 4,804,118 A | * | 2/1989 | Mullen et al. | 222/641 |
| 4,825,758 A | * | 5/1989 | Snowball et al. | 99/282 |
| 5,249,706 A | * | 10/1993 | Szabo | 222/20 |
| 5,340,211 A | | 8/1994 | Pratt | |
| 5,551,602 A | * | 9/1996 | Kurtzahn et al. | 222/105 |
| 5,921,440 A | | 7/1999 | Maines | |
| 6,186,361 B1 | | 2/2001 | Teetsel, III | |
| 6,253,957 B1 | | 7/2001 | Messerly et al. | |
| 6,497,343 B1 | | 12/2002 | Teetsel, III | |
| 6,659,311 B2 | | 12/2003 | Prueter | |
| 6,792,966 B2 | | 9/2004 | Harvey | |
| 7,237,691 B2 | * | 7/2007 | Danby et al. | 222/103 |
| 7,337,920 B2 | | 3/2008 | Duck et al. | |
| 2007/0192981 A1 | | 8/2007 | Lawshe | |
| 2007/0267446 A1 | | 11/2007 | Pressler | |
| 2009/0250491 A1 | | 10/2009 | Erman et al. | |
| 2010/0065587 A1 | | 3/2010 | Erman et al. | |

FOREIGN PATENT DOCUMENTS

| | | |
|---|---|---|
| WO | WO 9425354 | 11/1994 |
| WO | WO 2004037595 | 5/2004 |
| WO | WO 2005030276 | 4/2005 |
| WO | WO 2008153535 | 12/2008 |
| WO | WO 2010/038047 | 4/2010 |

OTHER PUBLICATIONS

Silver King®, Majestic Series Milk Dispensers specification sheet FNSKMAJ09, 2009.
Silver King® Cream Dispenser, Model SKMCD1P, equipment manual for McDonald's Corporation®, 2005.

(Continued)

*Primary Examiner* — John K Fristoe, Jr.
*Assistant Examiner* — Angelisa Hicks
(74) *Attorney, Agent, or Firm* — Kelly & Krause LP; Joseph P. Krause, Sr.

(57) ABSTRACT

A pinch valve has a pinch bar constructed and arranged to translate between two different positions when the pinch bar lies in any orientation. The pinch bar is comprised of two orthogonal legs, one of which extends through and rotates inside a hole formed into a body for the valve. Having the pinch bar rotatable enables the pinch bar to be rotated away from where it would open and close a flexible tube.

24 Claims, 4 Drawing Sheets

OTHER PUBLICATIONS

SureShot® Dispensing Systems, Advance Portion Controlled Refrigerated Liquid Dispensers specification sheet, A.C. Dispensing Equipment, Lower Sackville, Nova Scotia Canada, Jan. 2011.

SureShot® Dispensing Systems, Suggested Preventive Maintenance Checklist for Refrigerated Liquid Dispenser, A.C. Dispensing Equipment, Lower Sackville, Nova Scotia Canada, Sep. 2006.

SureShot® Intellishot Dispensing System Specification; A.C. Dispensing Equipment Inc., Sep. 2007.

Fluid Mechanics, Fundamentals and Applications; Yunus A. Cengal and John M. Cibal; chapter 12: Radiation Process and Properties, McGraw Hill, Higher Education, copyright 2006.

Fundamentals of Fluid Mechanics Fifth Edition; Bruce R. Munson, Donald F. Young, and Theodore H. Okiishi; copyright 2006.

SureShot® Flexoshot, A.C. Dispensing Equipment Inc., Lower Sackville, Nova Scotia Canada, Sep. 2007.

* cited by examiner

PINCH VALVE

BACKGROUND

A pinch valve is a valve operable with a flexible tubing or hose, which is capable of pinching the tube or hose using a tube-pinching mechanism. Pinch valves are typically full bore, linear action valves that can be used in an off/on manner. However, some pinch valves can be used in a variable position or throttling service.

Pinch valves are used in many medical and pharmaceutical applications. They are also used in food dispensing applications because a main advantage of pinch valves is that they facilitate cleanliness, excellent drainage, and ease of cleaning. In addition to cleanliness, another advantage of pinch valves is their operation speed. Most pinch valves are simply on-off valves; they open and close a flexible tube using a pinch bar that moves between two positions. Moving a pinch bar through two, fixed locations can be done quickly, especially if the pinch bar is moved by an electrically-actuated solenoid.

Electromechanical closure of a pinch valve is typically accomplished by activating a solenoid to draw a spring-biased bar or gate against an elastomeric sleeve or tube, thereby cutting off fluid flow through the tube or sleeve. Some prior art pinch valves are fluid actuated wherein the pinching action is accomplished by air or hydraulic pressure placed on the elastomeric sleeve or tube.

A problem with prior art pinch valves, especially those used with food and liquid dispensers, is that they do not facilitate the installation and removal of a bulk container. Stated another way, prior art pinch valves typically require disassembly to install and/or remove a tube passing through them and also for cleaning.

DETAILED DESCRIPTION

Figure 1:
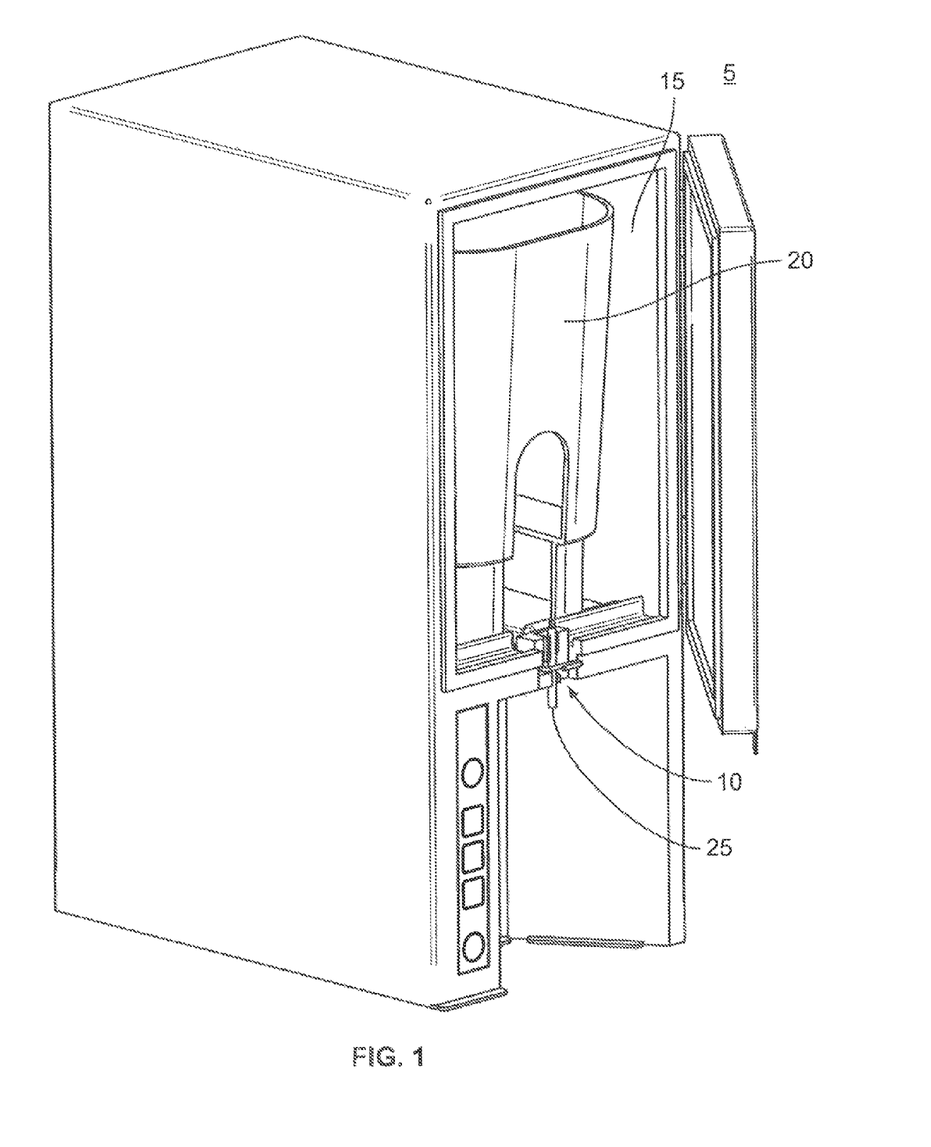
FIG. 1 is a perspective view of a dispenser for liquids.

FIG. 1 is a perspective view of a dispenser for liquids 5. The dispenser 5 is disclosed in the Applicant's co-pending patent application Ser. No. 12/885,659 entitled Dispenser For Liquids, filed on Sep. 20, 2010, the contents of which are incorporated herein by reference in its entirety. The dispenser 5 is able to consistently dispense user-selectable, fixed-volumes of dairy products using in part, an electrically-actuated, computer controlled pinch valve 10 described below.

The dispenser 5 has a cabinet 15 for liquids to be dispensed from replaceable bulk containers, which are well known to those of ordinary skill in the food service art. The bulk containers can be embodied as a tank having elongated flexible tube through which liquid in the tank can be drawn. Other bulk containers include disposable, flexible bladders integrally formed with flexible dispensing tubes.

Figure 2:
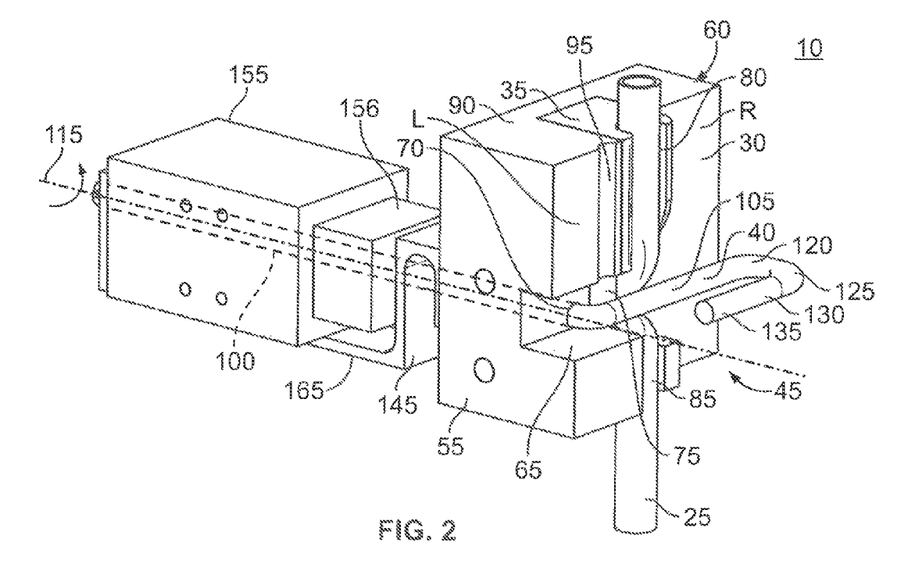
FIG. 2 is a perspective view of a preferred embodiment of a pinch valve, capable of use in the dispenser shown in FIG. 1, viewed from its front, left side.

Liquids are controllably dispensed from a container having a flexible discharge tube 25 using a pinch valve 10 located at the bottom of and partially extending through the bottom of the upper, refrigerated portion 20 of the cabinet 5. A short length of flexible discharge tubing 25 is shown in FIG. 2 as passing "through" the pinch valve 10. The tubing 25 would ordinarily extend from, or be connected to, a bulk container in the refrigerated portion 20 as shown in FIG. 1.

FIG. 2 is a perspective view of a preferred embodiment of the pinch valve 10, viewed from its left front. The valve 10 is comprised of block of rigid material having at least one, relatively flat vertical surface 75 on the front 45 of the block, against which a pinch bar 40 can exert a compressive force against a flexible tube 25 placed between the flat surface 75 and pinch bar 40. The block of rigid material and the flat surface 75 are considered to be a valve body 30.

In the preferred embodiment, the valve body 30 is comprised of plastic, molded around a block of aluminum 35. The block of aluminum 35 has the aforementioned flat surface but it is also formed with vertically-oriented U-shaped channels above and below the flat surface 75. The width and depth of the channels are sized to receive at least part of the outside surface of a dispensing tube 25. The channels act to hold the dispensing tube 25 vertically, i.e., keep the tube 25 aligned at a right angle to the pinch bar 40. For identification purposes, the block of aluminum with the alignment channels is referred to herein as a dispensing tube alignment block 35. Being made of a thermally conductive material, the alignment block 35 also acts as a heat sink that absorbs heat from a tube passing through the block 35. The aluminum block 35 is preferably in thermal communication with the refrigerated portion of the cabinet.

Flexible tubing 25 can be pinched and un-pinched by the pinch bar 40 as it translates horizontally, relative to the vertically-oriented flat surface 75 of the alignment block 35. In a preferred embodiment, the pinch bar 40 has a shape reminiscent of the upper-case letter "L." one leg of the pinch bar 40 extends through a hole, preferably formed through the valve body 30, through a bias spring on the rear side of the valve body where it connects with a solenoid. In an alternate embodiment, the pinch bar translates through a hole formed in a surface of the cabinet 15 instead of the valve body.

In FIG. 2, the tubing 25 is depicted as being pinched, which closes the tube 25. Opening the valve, of course, requires the tube 25 to be un-pinched. Unlike some prior art pinch valves, the pinch bar 40 (and hence the valve) is configured to be opened by moving horizontally away from the valve body 30, away from the tube 25 and toward a user. Stated another way, the valve 10 is opened by pulling or otherwise moving the pinch bar 40 away from the flat surface 75 or other surface of the dispensing tube alignment block 35 against which the pinch bar 40 applies force to the tube. The pinch bar is therefore configured as shown so that it can be pulled away from the valve body 30 manually in order to manually dispense liquids but also to rotate the pinch bar 40 away from the tube 25 to facilitate the removal and replacement of the tube 25. The manual and automatic operation of the pinch bar 40 and the ability of the pinch bar to be rotated away from the tube is described below.

As can be seen in the figures, the valve body 30 has a front side 45 that faces outwardly from the cabinet 5 and toward a user. The valve body 30 also has a substantially flat or planar rear side 50, the edge of which can be seen in FIG. 5 and FIG. 6. Back and forth movement of the pinch bar 40 relative to the front face 45 of the valve body 30 closes and opens the tube 25 by the pinch bar 40 pinching and un-pinching the tube 25, respectively. The time that the valve is open, i.e., the tube is un-pinched, determines the volume (or weight) of liquid that is dispensed through the valve. The determination of the valve open time is described in the Applicant's co-pending patent application Ser. No. 12/885,659 which is incorporated herein by reference.

Figure 8:
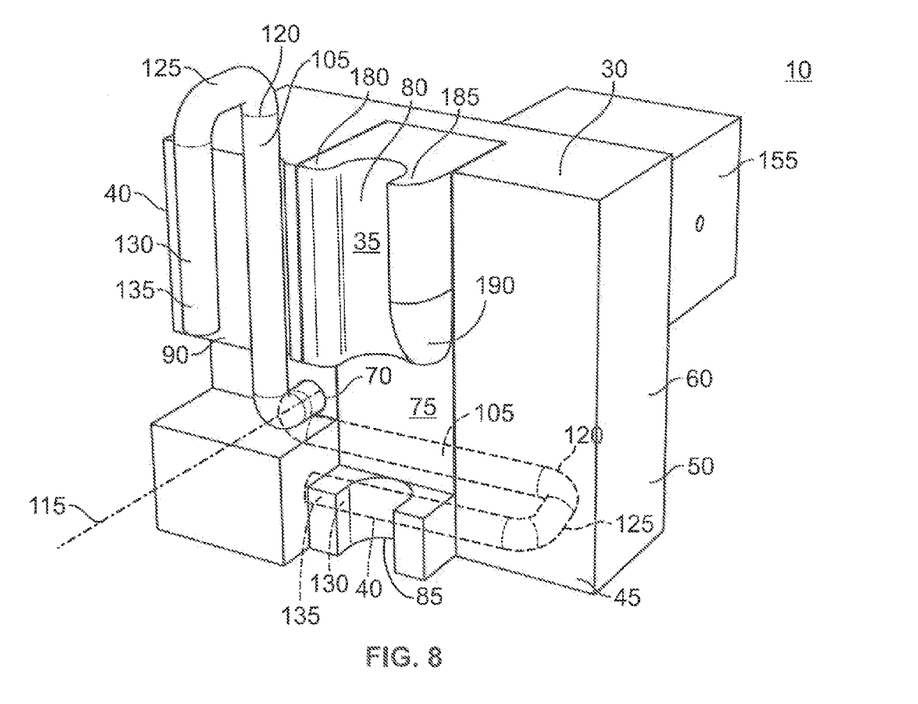
FIG. 8 is a perspective view of the pinch valve showing the pinch bar in two, different angular positions.

The valve body has a left side face 55 and an opposing right side face 60. The left-hand side L of the valve body 30 is slightly thicker than the right-hand side R to form a raised stop block 90. The raised stop block portion 90 provides a park position for the pinch bar 40, when the pinch bar 40 is rotated vertical, as shown in FIG. 8. The pinch bar 40 is rotated as shown in FIG. 8 when the tube 25 is being replaced or when needed to hold the valve 10 open. A vertically-oriented shallow groove 95 formed into the front surface of the left-hand side L of the stop block 90 provides a detent for the pinch bar 40 when the pinch bar 40 is rotated vertical.

Below the groove 95, a horizontal notch 65 having a rectangular cross section is formed in the left hand side L of the valve body 30. A hole 70 for the pinch bar 40 extends completely through the left-side of the plastic valve body 30 and is located at the bottom of the notch 65. In the preferred embodiment, the bottom of the notch 65 is substantially co-planar with a substantially planar and adjacent surface 75 formed on the aluminum dispensing tube alignment block 35. The planar surface 75 is considered herein to be a "valve surface" in the sense that it cooperates with the pinch bar 40 to open and close a tube 25 by the translation of the pinch bar. The planar surface/valve surface is vertically between U-shaped channels 80 and 85.

Alternate embodiments of the valve 10 include using valve surfaces that are not planar. The term valve surface should therefore be construed to include surfaces that are raised or articulated above a planar area. Stated another way, the valve surface can be convex.

The pinch bar 40 opens and closes the tube 25 by translating between a valve-closed position and a second, valve open position. The pinch bar 40 closes the tube 25 when the pinch bar 40 is drawn toward the planar surface 75 on the aluminum dispensing tube alignment block 35. The pinch bar 40 opens the tube 25 when the pinch bar 40 is urged away from the planar surface 75 on the aluminum dispensing tube alignment block 35.

In the embodiments shown in the figures, the translation between the first and second positions takes place in a substantially horizontal plane due to the fact that the pinch bar 40 and its various sections are preferably substantially co-planar. In alternate embodiments, however, translations between the first and second, valve open/valve closed positions takes place in other directions and in other, non-horizontal planes.

Figure 3:
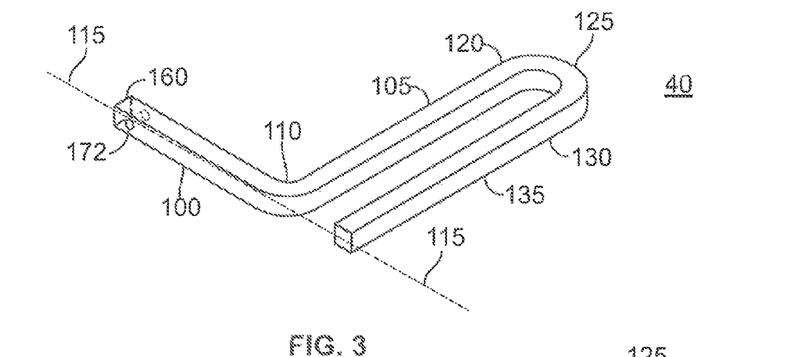
FIG. 3 and FIG. 4 are perspective views of two different embodiments of a substantially L-shaped pinch bar.
Figure 4:
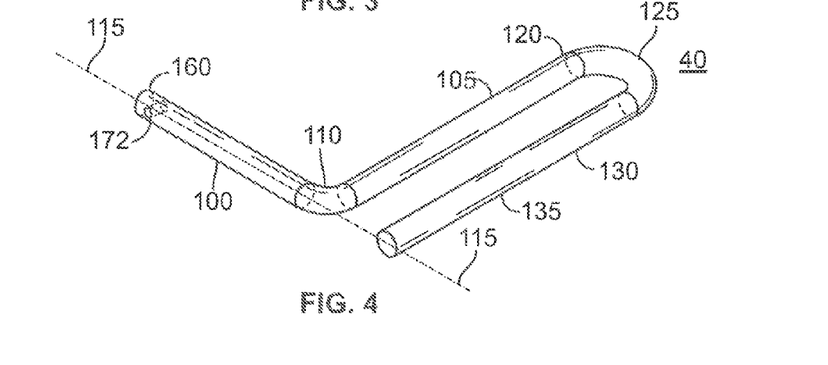

FIG. 3 and FIG. 4 are perspective views of two different but functionally equivalent embodiments of a substantially L-shaped pinch bar 40 used in the preferred embodiments of the valve 10. The pinch bar 40 shown in FIG. 3 has a rectangular cross section; the pinch bar 40 in FIG. 4 has a circular cross section. Regardless of the shape of the cross section, the pinch bar 40 is preferably formed by bending a solid bar of a ferrous material such as steel, around a first mandrel (not shown) to form two orthogonal legs. The first leg is identified in the figures by reference numeral 100; the second leg is identified by reference numeral 105.

The first leg 100 and the second leg 105 have corresponding lengths. The length of each leg can be measured from an imaginary intersection point 110 of the two orthogonal legs. The intersection point 110 of the two legs 100 and 105 is a point around which a bar of material is bent around a mandrel by which the two legs 100 and 105 are formed.

Regardless of the cross sectional shape of the bar from which the pinch bar 40 is made, the first leg 100 has a geometric axis of rotation 115 around which the first leg 100 can rotate. The cross sectional shapes and dimensions of the first leg 100 of each embodiment of the pinch bar 40 shown in FIGS. 3 and 4 and the diameter of the hole 70 are selected to permit the first leg 100 to rotate around its axis of rotation 115, inside the hole 70 formed through the valve body 30. The axis of rotation 115 of the first leg 100 is therefore substantially co-linear with the center line of the hole 70 formed into the valve body 30 and preferably orthogonal or nearly orthogonal to the front face 45 of the valve body 30.

Rotation of the first leg 100 around its axis of rotation 115 in the hole 70 rotates the second leg 105 through a corresponding angle measured around the axis of rotation 115. The L-shaped pinch bar 40, and, of course, the second leg 105, can thus be rotated in the hole 70 and around the axis of rotation 115 by rotating either the first leg 100 or the second leg 105.

The second leg 105 has a first end considered to be located at or near the intersection point 110 of the two legs 100 and 105. The second leg 105 has a second end 120 located away from the intersection 110.

The bar from which the pinch bar 40 is formed, is bent again at or near the second end 120 of the second leg 105 in order to provide a substantially U-shaped portion 125. The U-shaped portion 125 of the second leg 105 essentially bends the second leg portion of the pinch bar 40 back upon itself to provide a substantially J-shaped handle 130 for a user to grasp. The J-shaped handle 130 for the pinch bar 40 is comprised of the U-shaped portion 125 and a relatively long handle portion 135. The long portion 135 of the J-shaped handle 130 is preferably formed to be substantially parallel to the second leg 105. The separation space between the second leg 105 and the linear portion 135 of the J-shaped handle 130 is defined by the width of the U-shaped portion 125. The separation space is preferably selected to be wide enough to allow at least one finger of an operator to fit into the J-shaped handle 130 so that an operator can grasp the J-shaped handle 130 and pull the pinch bar 40 forwardly, i.e., out of the hole 70 and away from the first side 45 of the valve body 30.

Figure 5:
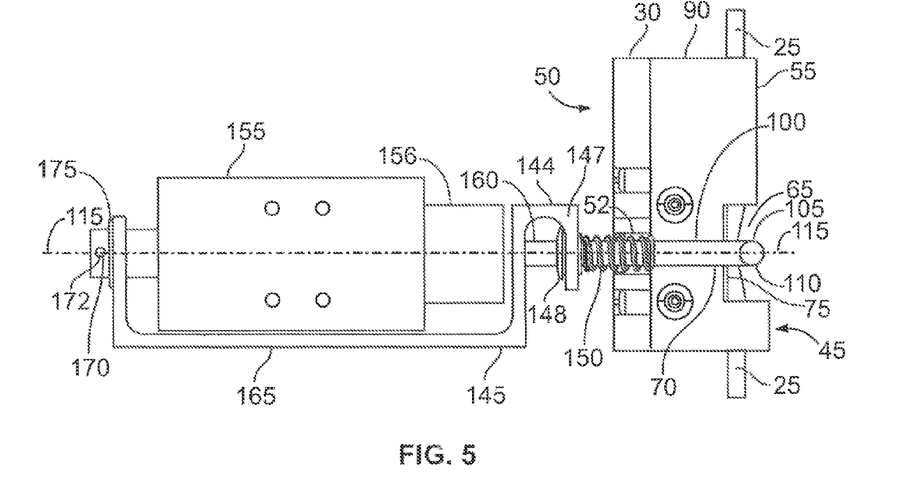
FIG. 5 is a side view of the pinch valve shown in FIG. 2 in the closed position.

FIG. 5 is a side elevation view of the valve 10 shown in a closed position, i.e., with the tube 25 pinched. The valve 10 is constructed to have a coil spring 150 that fits partway inside a blind hole 52 formed into the rear side 50 of the valve body 30. The valve 10 exerts a force against the vertical face 147 of a top portion 144 of a bracket 145 having a shape reminiscent of the letter "S" laid sideways.

The first leg 100 of the pinch bar 40 passes through the hole 70 formed into the valve body 30, through the spring 150 and through a hole (not visible) formed into the vertical face 147 of the top portion 144. The end of the first leg 100 that projects through the vertical portion 147 is fixed to the vertical portion 147 by a clip, such as a dished internal tooth lock washer 148 or equivalent.

The length and diameter of the spring 150 are selected such that the spring 150 biases the bracket 145 away from the rear 50 of the valve body 30. Since the first leg 100 is attached to the bracket 145, movement of the bracket 145 away from the valve body 30 by the force provided by the spring 150 pulls the second leg 105 into the tube 25, pinching it closed. The valve 10 is thus normally closed and is opened by moving the second leg 105 of the pinch bar 40 away from the front of the valve body and toward a user.

A solenoid 155 is attached to brackets, which are not shown in the figures for clarity but which fix the solenoid in space, relative to the valve body 30. The solenoid 155 includes a winding, not shown, through which a current flows to generate an electromagnetic field in a ferromagnetic core 156. The orientation of the magnetic field provided by the solenoid can be changed by the direction of current flowing through the winding. Since the valve is normally closed, the current flow through the solenoid is selected such that when current flows through the solenoid, it creates an electromagnetic field that will drive the bracket 145 toward the valve body 30 as can be seen in FIG. 6.

Figure 6:
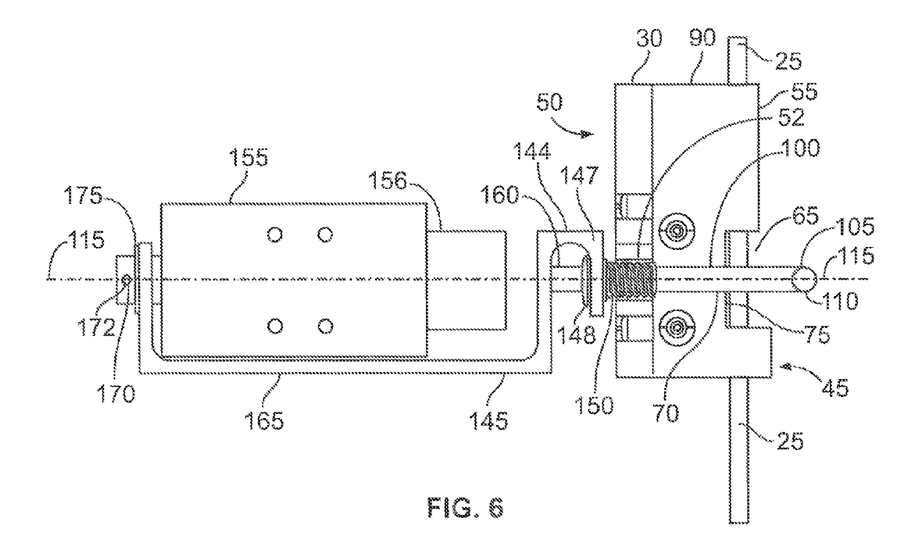
FIG. 6 is another side view of the pinch valve in an open position.

FIG. 6 is also a side view of the valve 10. The spring 150 is shown as being compressed by the vertical face 147 of the top portion 145, into the blind hole 52. The second leg 105 of the pinch bar 40 is shown as being away from the front side of the valve body 30.

The spring 150 maintains a force on the first leg that biases the valve 10 to be closed. The force provided by the spring 150 is great enough to compress (pinch) the tube 25 but not so great that the pinch valve 10 manually opened. The J-shaped handle 130 portion of the pinch valve 40 is configured to allow a user to grasp the handle portion 130 and overcome the force of the bias spring 150.

Figure 7:
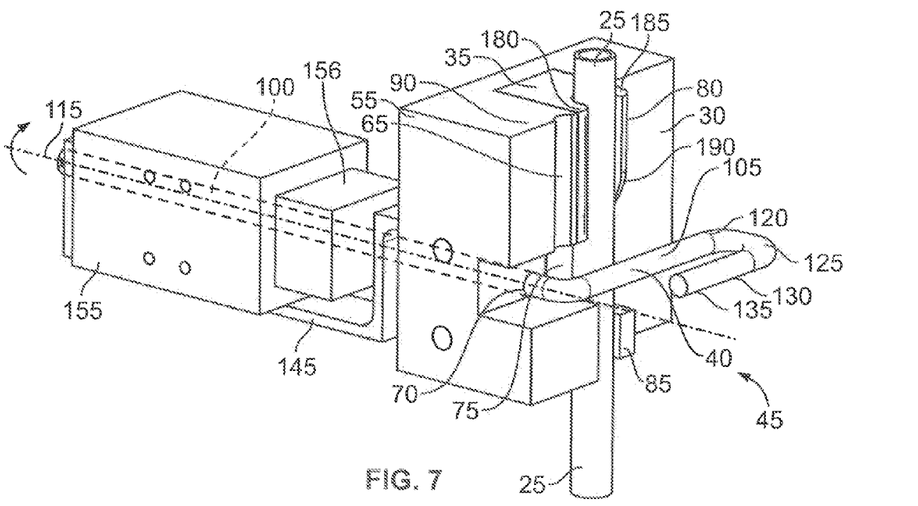
FIG. 7 is a perspective view of a preferred embodiment of a pinch valve, viewed from its right front side.

In a first position for the pinch bar 40 shown in FIGS. 2 and 5, the first leg 100 of the pinch bar 40 is forced leftward as shown in the figures. The second leg 105 of the pinch bar 40 is thus pulled toward the first side 45 of the valve body, as shown in FIGS. 2 and 5. In a second position of the pinch bar 40, which is shown in FIGS. 6 and 7, the first leg 100 is driven rightward in the figures, i.e., toward the valve body, which causes the second leg 105 to move away from the first side 45 of the valve body. Moving the second leg 105 away from the valve body 30 un-pinches the tube 25. The displacement of the first leg 100 between the first and second positions thus causes the second leg 105 to translate between third and fourth positions that are with respect to the front face 45 of the valve body 30. While the third and fourth positions of the second leg 105 are relative to the first side 45 of the valve body 30, but the distance separating them corresponds to the linear displacement of the first leg 100 in the hole 70 when the first leg travels between the first and second positions responsive to electric current passing through the solenoid 155.

FIG. 7 is a perspective view of the valve 10 viewed from the left front. The figure shows the pinch bar 40 with the second leg 105 in the fourth position. Fluid from a reservoir, such as a bulk dairy container in the dispenser shown in FIG. 1, can flow through the tube 25 as long as the pinch bar is held away from the valve body as shown in FIG. 7.

An important feature of the pinch valve 10 disclosed herein is its ability to facilitate removal and/or installation of a tube 25 in the valve 10 and hence, the removal and/or installation of a bulk liquid container inside a liquid dispenser 5. Removal and/or installation of a tube 25 in the valve 10 is facilitated by the ability of the pinch bar 40 to rotate around the axis 115 of the first leg 100, regardless of whether the second leg 105 is in the third or fourth positions.

FIG. 8 is a perspective view of the pinch valve 10 showing the pinch bar 40 in two, different angular positions, relative to the axis of rotation 115 of the first leg 100. FIG. 8 also shows that the pinch bar 40 can be rotated such that the second leg 105 can be rotated from a horizontal orientation to a vertical orientation and vice versa.

In FIG. 8, phantom lines are used to depict the second leg 105 and J-shaped handle 130 as being substantially horizontal. The pinch bar 40 and its various sections can thus be characterized as lying in a first plane, which as depicted in FIG. 8 is substantially horizontal.

The second leg 105 is shown in phantom lines as extending sideways, i.e., laterally away from the point of intersection 115 of the two legs, and away from the hole 70. The length of the second leg 105 is such that the second leg 105 extends sideways over the substantially planar first part 75 of the dispensing tube alignment block 35.

FIG. 8 also shows the second leg 105 of the pinch bar 40 and the J-shaped handle 130, in solid lines in order to depict them after being rotated counter-clockwise approximately ninety (90) degrees around the axis of rotation 115. The rotated pinch bar 40 and its various sections can be characterized as lying in a second plane, which is shown in FIG. 8 as being substantially vertical but also substantially orthogonal to the first plane. When the pinch bar 40 and its various sections are oriented as shown in FIG. 8, a dispensing tube 25 can be easily placed into or removed from the first and second U-shaped channels 80 and 85 of the thermally conductive dispensing tube alignment block 35.

Pinch bar rotation around the axis 115 to facilitate the removal and/or installation of a tube 25 is enabled in part by how the first leg 100 is attached to the solenoid. As shown in FIG. 6, the distal end 160 of the first leg 100 extends through a hole (not visible) in the bottom face 165 closest to the valve body of the S-shaped bracket solenoid 155. A dowel pin 170 extends through a small hole (not visible) formed into the first leg 100 near distal end 160. The dowel 170 rides over a washer or gasket 175 on the outside surface of the S-shaped bracket face 165 as the first leg 100 rotates around the axis of rotation 115. A rotatable coupling is thus provided by the hole in the bottom face 165 of the S-shaped bracket, the pin 170 and washer 175 enables the pinch bar 40 to freely rotate in the hole 70 formed in the valve body 30.

It is also important to note that pinch bar rotation is also facilitated in part by the dispensing tube alignment block 35. The upper U-shaped channel 80 of the block 35 has two sides 180 and 185 separated from each other by the U-shaped channel 80.

FIG. 7 and FIG. 8 show that the right side 185 of the upper U-shaped channel 80 has beveled edge, which is identified by reference numeral 190. When the second leg 105 of the pinch bar 40 is rotated counterclockwise around the axis of rotation 115, the second leg 105 runs over the beveled edge 190 and is thus levered away from the first side 45 of the valve body by the beveled edge 190. The beveled edge 190 thus effectively levers or "lifts" the second leg 105 away from the first side 45 of the valve body 30 and away from the planar surface 75 and onto the stop-block 90. A resting notch 95 formed in the left side, L, of the front face of the stop-block 90 provides a detent that holds the pinch bar 40 upright. Rotating the pinch bar 40 around its axis of rotation 115 thus allows a tube 25 to be removed from the dispensing tube alignment block 35 as happens when a bulk liquid container is removed and replaced.

It is important to note that the dispensing tube alignment block 35 is preferably made from a thermally conductive material such as aluminum. In a preferred embodiment, the aluminum dispensing tube alignment block 35 is sized, shaped, and arranged to extend upwardly and into thermal communication with refrigerated portions of the cabinet 5. The top end of the dispensing tube alignment block 35 is thus chilled, which enables the block 35 to act as a heat sink for the tube 25 and fluid therein.

The J-shaped handle 130 of the pinch bar 40, the first leg 100, the hole 70 and the solenoid are cooperatively sized, shaped and arranged as described herein such that a user of the cabinet 5 can fit one or more fingers within the J-shaped handle 130. A user can thus draw (pull) the pinch bar 40 away from the first side 45 of the valve body 30. Pulling the pinch bar 40 away from the first side 45 by at least the distance that corresponds to the different thickness of the left-hand side of the valve body 30, from the right-hand side of the valve body 30 allows a user to simultaneously rotate the second leg 105 into the detent/notch 65. The pinch bar can be re-positioned back to its operating position simply by grasping the J-shaped handle, pulling it away from the first side 45 of the valve body and rotating it clockwise.

The solenoid 155 is preferably computer-controlled. Circuitry and devices to interface a computer to devices like a solenoid are well known. A description of them is omitted for brevity.

A controlled, user-selectable volume of liquid can be dispensed through the pinch valve 10 by energizing the solenoid 155 for a period of time that is required to open the valve, i.e., unpinch a tube passing through the valve, in order to allow the user-selected volume to pass through the valve. The valve-open time can be determined as described in the applicants co-pending application Ser. No. 12/885,659. The valve open time can also be determined heuristically as happens in prior art creamer dispensers.

The foregoing description is for purposes of illustration only. The true scope of the invention is set forth in the appurtenant claims.

What is claimed is:

1. A pinch valve comprising:
a pinch bar having first and second legs, which are substantially orthogonal to each other, the first leg having a length and an axis of rotation substantially parallel to the length of the first leg, the second leg extending laterally across a first side of a valve surface; and
wherein the first leg of the pinch bar is translatable between first and second positions by linear translation of the first leg in first and second opposing directions, the first and second opposing directions being substantially parallel to the first leg's axis of rotation, such that linear translation of the first leg from the first position in the first direction, moves the first leg from the first position to the second position and moves the second leg of the pinch bar laterally away from the first side of the valve surface, linear translation of the first leg from the second position in the second direction moves the first leg from the second position to the first position and moves the second leg laterally toward the first side of the valve surface, the linear translation of the first leg between the first and second positions and the lateral translation of the second leg away from and toward the first side of the valve surface, being capable of pinching and un-pinching a flexible tube placed between the second leg and the first side of the valve surface.

2. The pinch valve of claim 1, wherein the valve surface comprises a heat sink.

3. The pinch valve of claim 1, wherein the pinch bar is configured to be rotatable relative to the valve surface such that rotation of the first leg around the axis of rotation, rotates the second leg through a corresponding angle.

4. The pinch valve of claim 3, wherein rotation of the first leg around the axis of rotation rotates the second leg to a park position.

5. The pinch valve of claim 1, wherein the pinch bar is configured such that translation of the first leg to the second position translates the second leg away from the valve surface.

6. The pinch valve of claim 1 further comprised of a spring coupled to the first leg and configured to urge the valve closed.

7. The pinch valve of claim 1, further comprising a solenoid operatively coupled to the first leg of the pinch bar and configured to translate the first leg between the first and second positions.

8. The pinch valve of claim 1, wherein the pinch bar is comprised of a handle that is configured to allow a user to manually open the pinch valve.

9. The pinch valve of claim 1, wherein the pinch bar is comprised of a handle that is configured to allow a user to grasp and rotate the pinch bar.

10. The pinch valve of claim 9, wherein the handle is J-shaped.

11. A pinch valve comprising:
a valve surface;
a pinch bar comprised of first and second legs, the first leg having a first length and a first axis of rotation, the second leg having a second length, at least part of the second leg being in front of the valve surface, the first and second legs being configured such that linear displacement of the first leg between first and second positions causes the second leg to translate laterally between third and fourth positions respectively, the third and fourth positions being relative to the valve surface; and
a solenoid coupled to the first leg of the pinch bar and configured to translate the first leg between the first and second positions responsive to an electrical signal applied to the solenoid.

12. The pinch valve of claim 11, wherein the valve surface is comprised of a planar first part, and wherein the second leg and said first part are configured such that when the second leg is in said third position, a flexible pipe placed between the second leg and first part of the valve surface will be pinched, the second leg and said planar first part being configured such that when the second leg is in said fourth position, a flexible pipe placed between the second leg and first part will be substantially un-pinched.

13. The pinch valve of claim 11, wherein rotation of the first leg around the axis of rotation rotates the second leg through a corresponding angle measured around the axis of rotation.

14. The pinch valve of claim 11, wherein the first leg of the pinch bar has a substantially rectangular cross section.

15. A pinch valve comprising:
a valve surface;
a pinch bar comprised of first and second legs, the first and second legs having first and second lengths respectively, at least part of the second leg being in front of the valve surface, the first and second legs being configured such that displacement of the first leg between first and second positions causes the second leg to translate between third and fourth positions respectively, the third and fourth positions being relative to the valve surface; and
a solenoid coupled to the first leg of the pinch bar and configured to translate the first leg between the first and second positions responsive to an electrical signal applied to the solenoid;
wherein the second leg has a substantially J-shaped handle comprised of first and second substantially linear portions connected to each other by an intermediate U-shaped portion, the first and second substantially linear portions of the J-shaped handle being separated from each other by a distance equal to a width of the U-shaped portion, the width of the U-shaped portion being selected to allow a finger to fit inside the J-shaped handle portion.

16. The pinch valve of claim 15, wherein the first U-shaped channel portion of the valve surface has a first side comprised of a beveled edge, which is configured to engage the second leg and to lever the second leg from the third position to the fourth position as the first leg rotates about said axis of rotation.

17. The pinch valve of claim 15, wherein the J-shaped handle is configured to:
enable the second leg to be manually urged from the third position to the fourth position and whereby the pinch bar first leg is manually urged from the first position to the second position; and
manually hold the second leg at the fourth position while simultaneously rotating the second leg and J-shaped handle about the geometric axis of rotation.

18. The pinch valve of claim 15, wherein the solenoid and J-shaped handle portion are configured to enable the valve to be opened manually.

19. The pinch valve of claim 15, wherein the valve surface is comprised of a thermally conductive material.

20. The pinch valve of claim 15, further comprised of a bias spring configured to urge the pinch bar to a closed position.

21. A method of operating a pinch valve comprised of a valve surface and a substantially L-shaped pinch bar having first and second orthogonal leg portions, at least part of the first leg portion extending through a hole formed in the valve surface, at least part of the second leg being in front of the valve surface and configured to extend laterally away from the hole and at least part way across the valve surface, the first and second legs being configured such that linear displacement of the first leg between first and second positions causes the second leg to translate laterally away from the valve surface and toward the valve surface respectively, the pinch valve being additionally comprised of a solenoid coupled to the first leg of the pinch bar and configured to selectively translate the first leg linearly between the first and second positions responsive to an electrical signal applied to the solenoid, the method comprising the steps of:
manually drawing the second leg of the pinch bar away from the valve surface; and
manually rotating the first leg of the pinch bar through a first angle, which is centered substantially on the first leg, thereby rotating the second leg through the same first angle.

22. The method of claim 21, wherein linearly translating the first leg between the first and second positions laterally moves the second leg between third and fourth positions respectively, the third and fourth positions being determined relative to the first side of the valve surface, the method comprising the additional steps of:
providing a first electrical signal to the solenoid, the first electrical signal causing the solenoid to move the first leg from the first position to the second position whereby the second leg moves from the third position to the fourth position.

23. The method of claim 21, further comprising the step of:
resting the pinch bar against a stop, after the pinch bar is rotated through said first angle.

24. The method of claim 21, wherein the step of rotating the pinch bar through a first angle is further comprised of:
rotating the second leg of pinch bar over a beveled edge on the first side, the beveled edge levering the second leg away from the first side of the valve surface.

* * * * *